(12) United States Patent
Kaiser

(10) Patent No.: US 8,907,535 B2
(45) Date of Patent: Dec. 9, 2014

(54) ELECTRIC MOTOR AND METHOD FOR ITS PRODUCTION

(75) Inventor: Bernhard Kaiser, Bonndorf (DE)

(73) Assignee: Dunkermotoren GmbH, Bonndorf/Schwarzwald (DE)

( * ) Notice: Subject to any disclaimer, the term of this patent is extended or adjusted under 35 U.S.C. 154(b) by 694 days.

(21) Appl. No.: 13/217,842

(22) Filed: Aug. 25, 2011

(65) Prior Publication Data

US 2012/0049670 A1    Mar. 1, 2012

(30) Foreign Application Priority Data

Aug. 26, 2010    (DE) .................... 10 2010 035 773

(51) Int. Cl.
*H02K 15/00* (2006.01)
*H02K 7/00* (2006.01)

(52) U.S. Cl.
CPC .................................. *H03K 11/0026* (2013.01)
USPC .......................................... 310/68 B; 310/90

(58) Field of Classification Search
CPC ......................................................... G01P 3/487
USPC .................................................. 310/68 B, 90
See application file for complete search history.

(56) References Cited

U.S. PATENT DOCUMENTS

| | | | |
|---|---|---|---|
| 4,646,088 A * | 2/1987 | Inoue ........................ | 340/870.31 |
| 4,795,901 A * | 1/1989 | Kitazawa ................ | 250/231.16 |
| 5,155,401 A | 10/1992 | Kanaya et al. | |
| 5,565,721 A * | 10/1996 | Knappe ........................ | 310/68 B |
| 5,866,962 A * | 2/1999 | Kim .............................. | 310/68 B |
| 6,731,032 B1* | 5/2004 | Muszynski ................ | 310/68 B |
| 2004/0129869 A1* | 7/2004 | Stridsberg ................. | 250/231.13 |
| 2004/0212261 A1* | 10/2004 | Uchiyama .................... | 310/68 B |
| 2006/0208173 A1* | 9/2006 | Nakamura et al. ........ | 250/231.13 |
| 2010/0289487 A1* | 11/2010 | Mizuta ..................... | 324/207.25 |
| 2013/0144553 A1* | 6/2013 | Omata et al. .................. | 702/151 |

FOREIGN PATENT DOCUMENTS

| | | |
|---|---|---|
| DE | 101 09 186 A1 | 8/2002 |
| JP | 2007 097240 A | 4/2007 |

OTHER PUBLICATIONS

European Search Report received in European Patent Application No. 11 16 5-33, dated Jul. 3, 2014.

* cited by examiner

*Primary Examiner* — Quyen Leung
*Assistant Examiner* — David Scheuermann
(74) *Attorney, Agent, or Firm* — Michael Best & Friedrich LLP

(57) ABSTRACT

An electric motor (10) for a machine tool or the like. The electric motor (10) is provided with a shaft (12) on which an encoder disk (15) is arranged. A first bushing (17) is provided and is connected to the encoder disk (15). The encoder disk (15) is arranged with a sliding fit on the shaft (12), and rests on a stop in the axial direction. A second bushing (18) is provided, which is arranged adjacent to and at a distance from the first bushing (17) on the shaft (12), and is arranged with an interference fit on the shaft (12). A compression spring (19) is arranged between the first bushing (17) and the second bushing (18) such that the first bushing (17) is pushed against the stop.

8 Claims, 1 Drawing Sheet

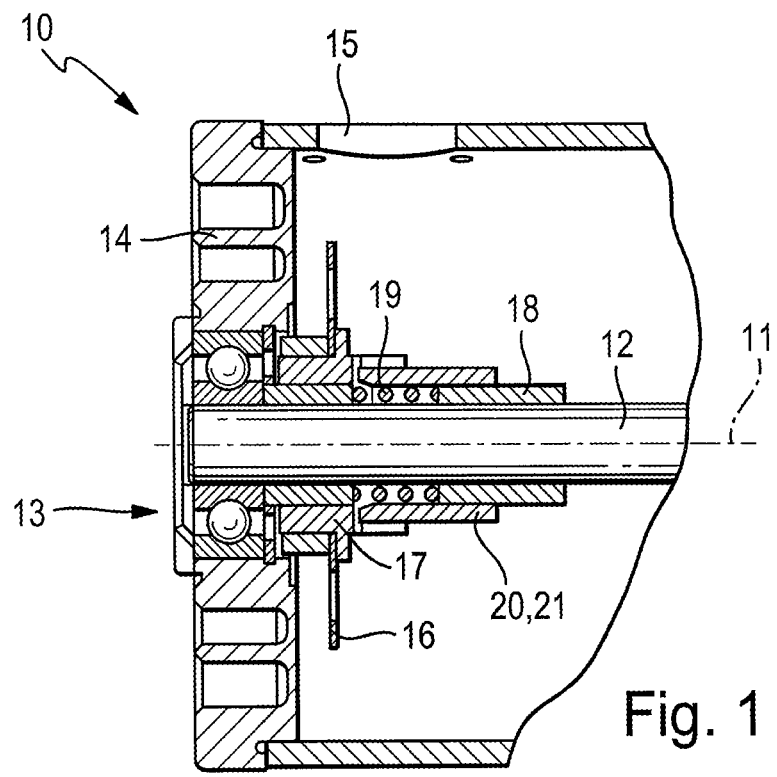
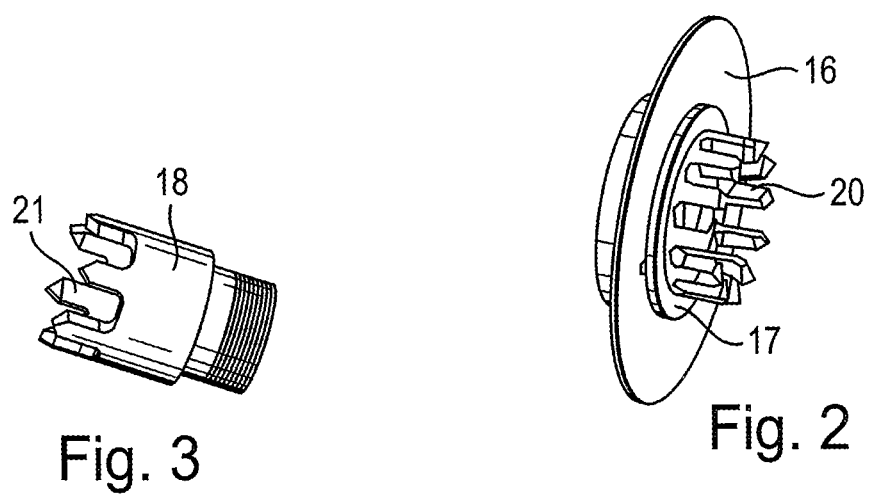

ELECTRIC MOTOR AND METHOD FOR ITS PRODUCTION

BACKGROUND OF THE INVENTION

The invention relates to an electric motor, in particular for a machine tool or the like. The invention likewise relates to a method for production of this electric motor.

An electric motor such as this is generally known and normally has at least one stator and one shaft with a rotor. By way of example, in the case of a machine tool, an electric motor such as this can be used to drive a machining table. An encoder disk is frequently provided in order to determine the rotation position and/or the rotation speed of the shaft and, for example, is arranged on the shaft. In order to achieve high accuracy in the determination of the rotation position of the shaft in particular, it is necessary to fix the encoder disk on the shaft with high accuracy. This requires a large amount of effort for fitting the encoder disk.

SUMMARY OF THE INVENTION

The object of the invention is to provide an electric motor which can be fitted easily and whose rotation position can be determined with high accuracy.

A first bushing is provided for the electric motor according to the invention and is connected to an encoder disk. The first bushing is arranged with a sliding fit on the shaft. The first bushing rests on a stop in the axial direction. Furthermore, a second bushing is provided and is arranged adjacent to and at a distance from the first bushing on the shaft. The second bushing is arranged with an interference fit on the shaft. A compression spring is arranged between the first bushing and the second bushing such that the first bushing is pushed against the stop.

The advantage of the invention is that the first bushing together with the encoder disk is always pushed against the stop by the compression spring. The axial position of the encoder disk is therefore always fixed on the shaft by means of the stop. Even in the event of a longitudinal movement of the shaft, for example because of a small amount of play and/or a small amount of longitudinal expansion resulting from temperature, this axial position of the encoder disk will not change. This results in high accuracy for the determination of the rotation position of the electric motor. For example, if the electric motor is intended for driving a machining table of a machine tool, then the position of the machining table can also be determined accurately, by accurately determining the rotation position of the electric motor.

In one development of the invention, the first bushing and the second bushing are each provided with projecting fingers, which are aligned in opposite directions and are designed such that they can engage in one another essentially without any play. This results in the advantage that the position of the encoder disk is fixed in the rotation direction by the fingers which engage in one another and by the second bushing, which has an interference fit. Any longitudinal movement of the shaft therefore has no influence on the rotation position of the encoder disk.

In the method according to the invention for production of the electric motor, the second bushing is arranged with an interference fit on the shaft, the first bushing is arranged with a sliding fit on the shaft, and the compression spring is arranged between the first bushing and the second bushing. The shaft is expediently inserted with a sliding fit into a bearing. This assembly method is simple, involves little effort, and therefore costs little.

BRIEF DESCRIPTION OF THE DRAWINGS

Further features, application options and advantages of the invention will become evident from the following description of exemplary embodiments of the invention, which are illustrated in the drawings. In this case, all the described and illustrated features form the subject matter of the invention, in their own right or in any desired combination, irrespective of their composition in the patent claims or their back-references, and independently of their wording or presentation in the description and in the drawing.

FIG. 1 illustrates a schematic longitudinal section through a part of one exemplary embodiment of an electric motor according to the invention, FIG. 2 shows a perspective view of an encoder disk for the electric motor in FIG. 1, and FIG. 3 shows a perspective view of a bushing for the electric motor in FIG. 1.

DETAILED DESCRIPTION

FIG. 1 illustrates an electric motor 10, which is preferably used for a machine tool or the like. However, the electric motor may also be used for an electric door drive or an electrically operated set of blinds or an awning or the like. The electric motor 10 has a longitudinal axis 11, and is designed to be essentially symmetrical with respect to this longitudinal axis 11.

A shaft 12 is arranged approximately coaxially with respect to the longitudinal axis 11 and is fitted with a rotor, in a manner which is not illustrated. The shaft 12 is mounted such that it can rotate in a bearing 13, preferably in a ball bearing. The inner ring of the bearing 13 is mounted with a sliding fit on the shaft 12. The outer ring of the bearing 13 is held fixed in an end shield 14. The end shield 14 is aligned approximately transversely with respect to the longitudinal axis 11, and is connected to a housing 15. The housing 15 is tubular and is aligned approximately coaxially with respect to the longitudinal axis 11. A stator, which is associated with the rotor, is accommodated in a manner which is not illustrated in the housing 15.

An encoder disk 16 is arranged on the shaft 12. The encoder disk 16 is held on a first bushing 17 such that they cannot rotate with respect to one another. The encoder disk 16 is aligned approximately transversely with respect to the longitudinal axis 11. The first bushing 17 is mounted with a sliding fit on the shaft 12. The first bushing 17 with the encoder disk 16 held on it is arranged adjacent to the inner ring of the bearing 13 on the shaft 12. The inner ring of the bearing 13 forms a stop for the first bushing 17.

It is self-evident that the encoder disk 16 and the first bushing 17 may also be formed integrally. It is also self-evident that other components can also be provided, which represent a stop for the first bushing 17, in addition to or instead of the inner ring of the bearing 13.

The encoder disk 16 is provided, in a manner which is not illustrated, with features which can be used to determine the position and/or the rotation speed of the encoder disk 16. These features may then, for example, be scanned by electronics which are associated with the encoder disk 16. In particular, these electronics may be arranged on that side of the end shield 14 which faces the encoder disk 16.

A second bushing 18 is mounted with an interference fit on the shaft 12. The second bushing 18 therefore can neither be moved in the axial direction nor rotated in any rotation direction on the shaft 12. The second bushing 18 is arranged adjacent to the first bushing 17 on the shaft 12. There is at least a short distance in the direction of the longitudinal axis 11 between the two bushings 17, 18. There is a compression spring 19 between the two bushings 17, 18. Corresponding cutouts are provided for this purpose in the two bushings 17, 18. The arrangement of the two bushings 17, 18 and the configuration of the compression spring 19 are provided such that the first bushing 17, together with the encoder disk 16 which is held on it, is always pressed by the compression spring 19 against the inner ring of the bearing 13, and the compression spring 19 is in this case supported on the stationary, second bushing 18.

The first bushing 17 and the second bushing 18 are each provided with projecting FIGS. 20, 21, which are each arranged at a distance from one another on an imaginary coaxial cylindrical surface. The fingers 20, 21 are aligned in mutually opposite directions and are designed such that they can engage in one another, essentially without any play. To this extent, the shape of the fingers 20, 21 on a respective bushing 17, 18 is in each case matched to the shape of the intermediate spaces between the fingers 21, 22 on the respective other bushing 18, 17. The fingers 20, 21 run to a point at their free ends, such that they are automatically located in the correct angular position with respect to one another during assembly. It is self-evident that the fingers 20, 21 can be implemented by drivers formed in some other way.

The encoder disk 16 together with the first bushing and the fingers 20 there are illustrated in detail in FIG. 2, and the second bushing 18 with the fingers 21 there is illustrated in detail in FIG. 3. The way in which the fingers 20, 21 engage in one another can be seen from these two figures.

During assembly of the electric motor 10, the second bushing 18 is arranged at a previously defined position in the axial direction on the shaft 12, and is fitted there as an interference fit. By way of example, the second bushing 18 can be pressed onto the shaft 12. The first bushing 17 together with the encoder disk 16 held on it is then pushed onto the shaft 12. It is self-evident that the two abovementioned assembly steps can also be carried out in the opposite sequence.

The compression spring 19 is fitted between the first bushing 17 and the second bushing 18. The shaft 12 is then pushed into the inner ring of the bearing 13, together with the encoder disk 16 and the second bushing 18. It is self-evident that the shaft 12 can also be pushed into the bearing 13 at an earlier or a later time.

During the course of the rest of the assembly process, other components (not shown) are mounted to the opposite end of the shaft 12 (that is, the end of the shaft opposite the shield 14). In this case, the second bushing 18 is pushed along the longitudinal axis 11, against the force of the compression spring 19, in the direction of the first bushing 17. As a consequence, the first bushing 17 is pushed against the inner ring of the bearing 13, together with the encoder disk 16, as has already been explained. It should be noted that the second bushing 18 can also be pushed in the direction of the first bushing 17 in a different manner, for example by appropriate axial fixing of the shaft 12 or the like.

If the shaft 12 moves in the direction of the longitudinal axis 11 during operation of the electric motor 10, for example because of a small amount of play of the shaft 12 and/or because of minor temperature-dependent length changes of the shaft 12, then this movement has no influence on the position of the first bushing 17, and therefore on the encoder disk 16, in the direction of the longitudinal axis 11. Axial movement of the shaft 12 such as this is compensated for with the aid of the distance between the two bushings 17, 18 and by means of the compression spring 19. The first bushing 17 together with the encoder disk 16 is always pressed against the inner ring of the bearing 13, which acts as a stop, independently of any movement of the shaft 12 in the direction of the longitudinal axis 11. The axial position of the encoder disk 16 is therefore defined precisely with respect to the end shield 14 and therefore also with respect to the housing 15 of the electric motor 10, and independently of possible axial movements of the shaft 12. As already explained, other components of the electric motor 10 may also form a stop for the first bushing 17, in such a way that, in this case, these other components fix the axial position of the encoder disk 16.

If, as has been mentioned, the electronics associated with the encoder disk 16 are fitted to the end shield 14, then the pushing of the first bushing 17 against the inner ring of the bearing 13 results in the position of the encoder disk 16 always remaining the same in the axial direction with respect to the electronics. For example, if the rotation position of the shaft 12, and therefore in the end the rotation position of the electric motor 10, is determined with the aid of the encoder disk 16 and the associated electronics, then this constant position ensures that the rotation position is determined with high accuracy.

The position of the encoder disk 16 in the rotation direction of the shaft 12 is ensured by the fingers 20, 21 engaging in one another without any play and by the interference fit of the second bushing 18, and is likewise independent of movements of the shaft 12 in the direction of the longitudinal axis 11. Any such axial movement of the shaft 12 is compensated for—as explained—with the aid of the compression spring 19, without this having any influence on the fingers 20, 21, which engage in one another, and therefore on the position of the encoder disk 16 in the rotation direction.

As has been explained, the first bushing 17 is pushed against the inner ring of the bearing 13 with the aid of the compression spring 19. This results in so-called axial positioning of the bearing 13. This reduces the noise produced by the bearing 13, and increases its life.

What is claimed is:

1. An electric motor for a machine tool or the like, the electric motor comprising:
    a shaft on which an encoder disk is arranged,
    a first bushing connected to the encoder disk, the first bushing arranged with a sliding fit on the shaft, the first bushing resting on a stop in the axial direction;
    a second bushing arranged adjacent to and at a distance from the first bushing on the shaft, the second bushing arranged with an interference fit on the shaft; and
    a compression spring arranged between the first bushing and the second bushing such that the first bushing is pushed against the stop.

2. The electric motor according to claim 1, wherein a bearing is provided, wherein the shaft is inserted with a sliding fit into the inner ring of the bearing and wherein the bearing forms the stop for the first bushing.

3. The electric motor according to claim 2, wherein the outer ring of the bearing is connected to a housing which is held in the housing.

4. The electric motor according to claim 1, wherein the axial position of the encoder disk on the shaft is fixed by the stop.

5. The electric motor according to claim 1, wherein the first bushing and the second bushing are each provided with projecting fingers, which are aligned in opposite directions and are designed such that they can engage in one another essentially without any play.

6. The electric motor according to claim 5, wherein the position of the encoder disk is fixed in the rotation direction by the fingers which engage in one another and by the second bushing, which has an interference fit.

7. A method for production of an electric motor according to claim 1, the method comprising:
- arranging the second bushing with an interference fit on the shaft;
- arranging the first bushing with a sliding fit on the shaft; and
- arranging the compression spring between the first bushing and the second bushing.

8. The method according to claim 7, wherein the shaft is inserted with a sliding fit into a bearing.

* * * * *